July 12, 1960  J. M. WOLF  2,944,811
BICYCLE REPAIR AND SERVICE STAND
Filed July 9, 1959
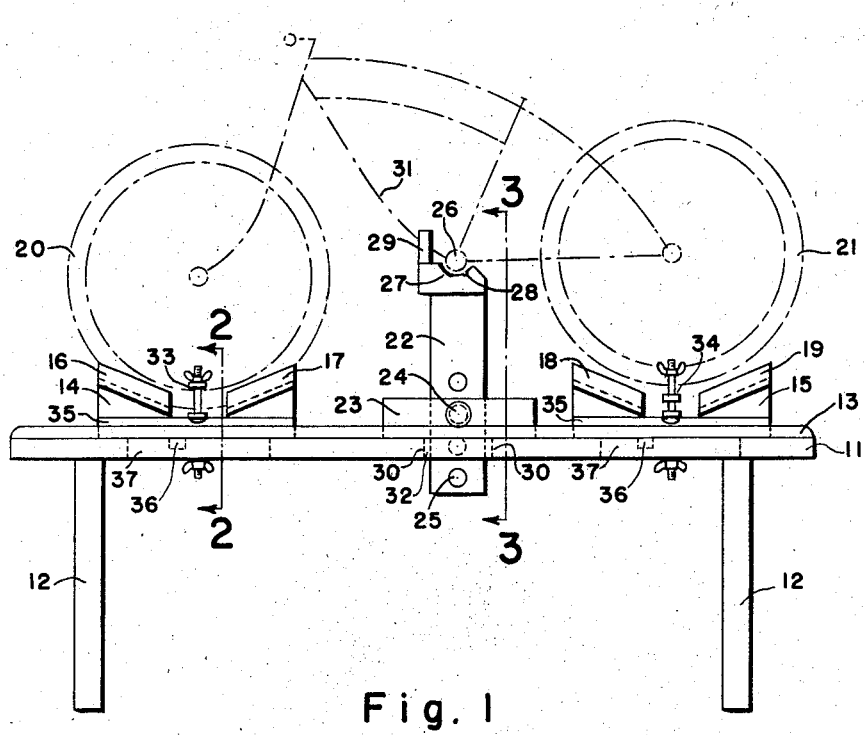
Fig. 1
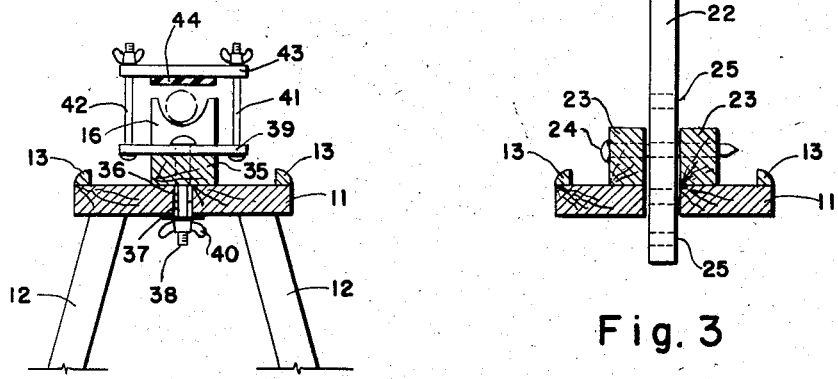
Fig. 2
Fig. 3
Joseph M. Wolf
INVENTOR.
BY R. F. Malloon
Agent United States Patent Office 2,944,811
Patented July 12, 1960

2,944,811

BICYCLE REPAIR AND SERVICE STAND

Joseph Michael Wolf, 2509 Reed St., Erie, Pa.

Filed July 9, 1959, Ser. No. 825,909

2 Claims. (Cl. 269—145)

My invention relates to a stand which securely supports a bicycle in an upright position during repair and servicing, and which permits easy wheel removal.

Bicycles of present day design are commonly equipped with motors and with various accessories attached to the handle bars and upper framework. This makes it desirable to service and repair bicycles in an upright position. Too, it is usually more convenient as well as precise to perform these operations with the bicycle in its regular operating position.

Heretofore, there have been available various stands and racks for supporting and holding bicycles. None of these, however, has proven to be completely satisfactory. Those that require inverting the bicycle are not at all usable if the bicycle has a motor or even if it has the simplest accessories mounted on the handle bars. Too, this type of stand places the bicycle in an unnatural position thereby increasing the difficulty of repairing or servicing. Most upright stands heretofore available generally have relied upon clamping the frame and have been unsteady when raised to a convenient working height. Furthermore, wheel removal from bicycles mounted on heretofore available upright stands has been difficult or even impossible with some models. Also, complete readjustment is usually required to accommodate a bicycle of only slightly different size or when changing from a man's bicycle to a woman's bicycle of even the same size.

An object of my invention is to provide a novel stand for securely holding a bicycle in an upright position during repair and servicing. A further object is to provide such a stand that permits easy removal of one or the other of the bicycle's wheels with no loss in stability. A still further object is to provide such a stand that may easily be adjusted to accommodate any size bicycle. Other objects include the provision of a stand of the character described that is relatively easy to construct and that is sturdy and dependable when in use.

The stand that I have invented incorporates a base that I prefer to elevate about two feet in order to put the bicycle at a convenient working height, though the exact height, of course, is not critical. Mounted on this base are two cradles for receiving and securing one or the other of the bicycle's wheels and a center support that supports the bicycle at the pedal crank housing. Each cradle is provided with a clamp that may be used to hold down a wheel. The cradle assemblies are secured to the base by bolts that are easily loosened, if need be, to permit adjusting the position of the cradles to accommodate bicycles of various sizes. Small variations in size are accommodated without need of adjustment, however. The center support is capable of several inches of longitudinal movement without affecting its ability to support a bicycle securely. The height of the center support is easily adjusted by the simple device of a combination bearing and adjusting spike inserted through the support.

My invention will be more fully understood by reference to the following detailed description and attached drawings. In the drawings:

Figure 1 is a side elevation of a preferred embodiment of my repair and service stand, depicting a bicycle in position for service or repair, Figure 2 is a sectional view, in part, taken along the line 2—2 of Figure 1 looking in the direction of the arrows, and Figure 3 is a sectional view, in part, taken along the line 3—3 of Figure 1 looking in the direction of the arrows.

The bicycle indicated in Figure 1 is of ordinary design, a man's bicycle in this case, although the stand works equally well and in similar fashion with ladies' bicycles. As shown, the front wheel is secured in its cradle and the rear wheel is elevated.

The bicycle repair and service stand is made up of a base 11 suitably having legs such as those at 12 in order to raise the whole up to a convenient working height. In order to provide a convenient working surface the base preferably is provided with a bead 13 at the sides and ends to prevent tools and small parts falling from the working surface of the base; this feature is not necessary, of course, to the working of my invention. Cradles 14 and 15 are slidably mounted at the forward and back end respectively of the base 11. Each of the cradles is made up of a pair of oppositely inclined wedges having upper grooved surfaces, indicated as 16 and 17 on cradle 14 and 18 and 19 on cradle 15. The angle of inclination of the upper surface of the wedges is suitably about 20°–30° with the horizontal. The cross sectional outline of each surface 16—19 is preferably elliptical (as depicted in Figure 2) although the outline may also suitably be V-shaped or U-shaped. Cradles 14 and 15 are adapted to receive the tires of either the front or rear wheel 20 or 21 of a bicycle supported by my stand. Although the bicycle stand depicted and described utilizes two cradles for greater convenience, the stand is operable with but one cradle.

The center support 22 is pivotally mounted on bearing blocks 23 by pin 24 passed through one of the transverse holes 25. The center support is arranged to receive the crank housing 26 of the bicycle. Crank housing 26 rests in depression 27 in the upper end of the support 22. A groove 28 is provided in depression 27 to accommodate the seam weld that is present on the crank housing of many makes of bicycles. Fingers 29, suitably of a fibrous material, laterally position the lower frame member 31 on the bicycle. It is appreciated that fingers 29 need not be separate pieces individually affixed to the center support but that the whole may be made of one piece of material but in the same configuration. In either event, fingers 29 secure the bicycle against lateral movement.

The height of the center support 22 can be adjusted to any desired height by placing the pin 24 in the proper hole 25 in the support. The center support 22 is relatively free to pivot about the pin 24; considerable movement forward and backward is permitted to accommodate bicycles of various sizes without requiring relocating the cradles. A limit to the forward and backward motion of the support is effected when the support bears against the ends 30 of slot 32. With a bicycle in position, however, the secure clamping of one of the wheels in its cradle causes the whole assembly to be firmly positioned and there is no tendency for movement of center support 22 even though it may not be bearing on an end of the slot.

Clamps 33 and 34 are provided to hold the front and rear bicycle wheels firmly in their respective cradles. The construction of clamp 33 may be seen in detail in Figure 2. Cradle base 35 is fitted with a key 36 which slides in slot 37 to constrain lateral movement of the cradle. Bolt 38 passes through lower clamping bar 39 and cradle base 35 and depends through groove 37. Tightening of wing nut 40 firmly locks the cradle assembly in position. As bolts 41 and 42 are tightened, upper clamping bar 43 presses the inner rim of the bicycle wheel holding it firmly. A pad 44 of rubber or similar material protects the finish of the wheel rim. The construction of clamp 34 is identical to that of clamp 33. It is contemplated that the clamping bars and bolts of either or both of these clamps can be replaced by a loop of flexible material, such as belting, secured by a buckle or the like.

In positioning a bicycle on the stand the center post preferably is adjusted so that the tires of both front and rear wheels appear to clear the cradles by about one inch. Then as one or the other of the wheels is lowered into its cradle and secured therein, the opposite wheel is elevated several inches above its cradle and free of hindrance. If it is desired to work on the rear wheel 21, for example, the front wheel 20 is lowered into cradle 14 and clamp 33 is fastened securely. This raises the rear portion of the bicycle so that wheel 21 clears its cradle 15 by several inches. This permits free rotation of the rear wheel or even its complete removal if desired. Likewise the motor, the pedal crank, the chain drive, gear-shifting mechanism, brakes, etc. are free to operate normally. The bicycle itself is securely and firmly held by the single clamp and cradle and center support post.

What I claim is as follows:

1. A bicycle repair and service stand comprising an elongated base; a first cradle mounted on said base and positioned at one end thereof; a second cradle mounted on said base and positioned at the opposite end thereof; each of said cradles comprising a cradle base, a pair of oppositely inclined wedges having grooved upper surfaces, said wedges mounted on said cradle base, and clamping means combined with each of said cradles for securing a wheel of a bicycle within the cradle and positioned in the grooved upper surfaces of said wedges; a substantially upright center support adapted at its upper end to receive and support the crank housing of a bicycle, said support pivotably mounted on said base at a point intermediate the ends of said base.

2. A bicycle repair and service stand comprising an elongated base; a first cradle slidably mounted on said base and positioned at one end thereof; a second cradle slidably mounted on said base and positioned at the opposite end thereof; each of said cradles comprising a cradle base, a pair of oppositely inclined wedges having grooved upper surfaces with substantially elliptical cross section, said wedges mounted on said cradle base; a clamp combined with each of said cradles; said clamp comprising an affixed lower clamping bar mounted on said cradle base, a movable upper clamping bar, bolts positioned through the extremities of said bars, said bolts adapted to be tightened to cause said upper and lower clamping bars to constrain that portion of a bicycle wheel positioned therebetween; a substantially upright center support adapted at its upper end to receive and support the crank housing of a bicycle; a pair of fingers affixed to the upper end of said support, said fingers adapted to restrain lateral movement of the lower frame member of a bicycle in position on said stand; a plurality of transverse holes positioned at spaced intervals within said support; a pin adapted to be positioned within one of said holes and to bear on blocks mounted on said base at a point intermediate the ends of said base.

References Cited in the file of this patent

UNITED STATES PATENTS

| 598,040 | Webster | Jan. 25, 1898 |

FOREIGN PATENTS

| 29,516 | Great Britain | Dec. 14, 1897 |
| 29,863 | Great Britain | Dec. 17, 1897 |